H. G. IVES.
Sheep Rack.
No. 64,983. Patented May 21, 1867.
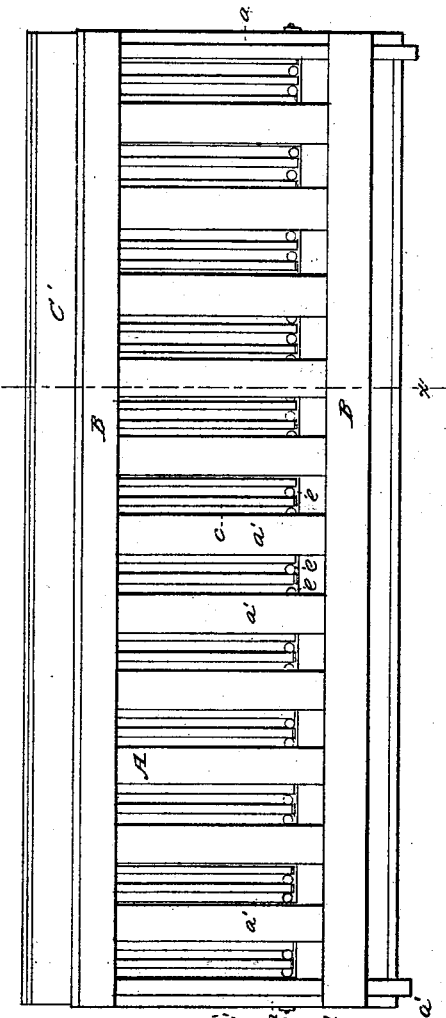
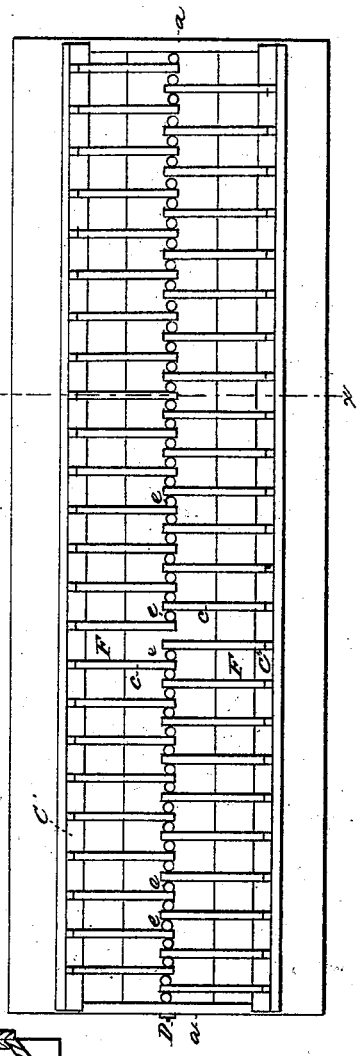
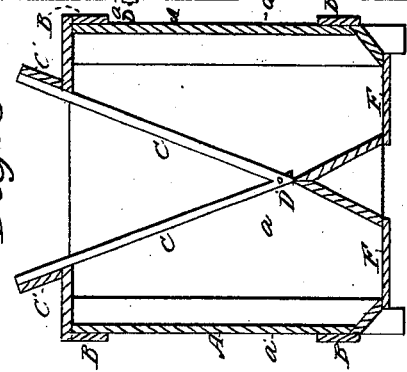
Witnesses:
O. D. Smith
J. C. Kemow
Inventor:
Munn & Co
Attorneys for
Peter G. Ives
Per O. Knight
Supt

United States Patent Office.

HEBER G. IVES, OF DURHAM, CONNECTICUT.

*Letters Patent No. 64,983, dated May 21, 1867.*

IMPROVEMENT IN SHEEP-RACKS.

*The Schedule referred to in these Letters Patent and making part of the same.*

TO ALL WHOM IT MAY CONCERN:

Be it known that I, HEBER G. IVES, of Durham, in the county of Middlesex, and State of Connecticut, have invented a new and useful Improvement in Sheep-Racks; and I do hereby delare the following to be a full, clear, and exact description of the nature, construction, and operation of the same, reference being had to the accompanying drawings which are made a part of this specification, and in which—

Figure 1 is a side elevation.

Figure 2 is a plan.

Figure 3 is a transverse vertical section on the line $x\ x$, figs. 1 and 2.

Similar letters of reference indicate corresponding parts in the several figures.

This invention relates to a sheep-feeding apparatus consisting of a hay-rack, a trough or troughs for containing grain or roots, and a guard railing to keep the animals from crowding each other or jumping into the trough. The principal object of the improvement is to enable the racks to be turned so as to uncover the troughs and thus facilitate the cleaning out of the latter; and a further object is to so construct and connect the two troughs of a feeding apparatus that the grain or roots may be poured into the rack and be deposited through the latter into the troughs in equal quantities.

In order that others skilled in the art to which my invention appertains may be enabled to fully understand and use the same, I will proceed to describe it in detail.

In the accompanying drawings, A represents the external frame, consisting of the two solid end pieces $a\ a$, and a series of guards or flat boards $a'$, which are nailed or otherwise secured to the longitudinal cleats or connecting-pieces B B. The guards $a'$ are to be about six inches in width, and between every two guards there is a space equal to the width of each guard, so that a foot of space is allotted to each animal when the flock is feeding. This is considered sufficient room to prevent crowding, but the spacing of the rails may be varied to any desired extent. C C represent the racks, which are composed each of a series of bars, connected at top by the bar $C'$, and attached to a common supporting rod, D, upon which their lower ends are held at a suitable distance asunder by means of the tubular spacing-blocks $e\ e\ e$, which are fitted upon the rod and occupy positions between the ends of the rack-bars as represented. The rod D may be fitted in the ends or heads $a$, and the rack-bars are pivoted or fitted to turn upon the rod D, so, that when it becomes desirable to clean out the troughs F F, the racks may both be turned up so as, for the time being, to stand in a vertical position at the centre of the apparatus, or one may be thus turned up vertically; in either case the trough or troughs being made accessible from above, so that one can reach over the top of the guards and remove the refuse or filth, instead of being compelled to do the work through the guards. This mode of pivoting the rack may be employed with equal advantage when only a single rack and trough are employed, this being generally the construction if the apparatus is to be placed against the side of a building, in which case the animals feed at one side only. The inner sides of the troughs F F converge toward and are joined to each other at top, where they meet at such an angle that roots or grain poured into the rack C will fall into the troughs in equal quantities, the inclined sides of the trough, united, as above stated, forming an equalizing distributor. The lower portions of the racks C C are in suitable proximity to the guards $a'$ to admit of the hay being reached by the animals, the spaces between the guards sufficing for the passage of their heads and neck only. They are thus kept from rummaging about in the grain, and at the same time are permitted to draw out the hay in such limited quantity that they will not be induced to scamper away and waste the hay about the field, which they do when the hay can be drawn out in unlimited mouthfuls.

Having thus described by invention, the following is what I claim as new herein, and desire to secure by Letters Patent:

1. I claim pivoting the hay-rack of a sheep-feeding device, so that by adjusting or turning the same the trough beneath may be exposed to facilitate cleaning, substantially as described.

2. I claim the combination, with the racks C C, of two troughs F F, having their contiguous inclined sides joined together at top at an angle for the purpose of distributing the grain or roots, substantially as set forth.

To the above specification of my improved sheep-rack I have signed my hand this 13th day of November, 1866.

HEBER G. IVES.

Witnesses:
SOLON C. KEMON.
A. TANNER.